(12) United States Patent
Poliyapram et al.

(10) Patent No.: US 12,738,034 B2
(45) Date of Patent: Sep. 15, 2026

(54) INFORMATION PROCESSING APPARATUS, INFORMATION PROCESSING METHOD, AND NON-TRANSITORY COMPUTER READABLE MEDIUM

(71) Applicant: RAKUTEN GROUP, INC., Tokyo (JP)

(72) Inventors: Vinayaraj Poliyapram, Tokyo (JP); Jeremiah Anderson, Tokyo (JP); Mayank Bansal, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 892 days.

(21) Appl. No.: 17/915,841

(22) PCT Filed: Oct. 15, 2021

(86) PCT No.: PCT/JP2021/038267
§ 371 (c)(1),
(2) Date: Apr. 20, 2023

(87) PCT Pub. No.: WO2023/062825
PCT Pub. Date: Apr. 20, 2023

(65) Prior Publication Data
US 2024/0212331 A1 Jun. 27, 2024

(51) Int. Cl.
*G06V 10/776* (2022.01)
*G06V 10/764* (2022.01)
(Continued)

(52) U.S. Cl.
CPC .......... *G06V 10/776* (2022.01); *G06V 10/764* (2022.01); *G06V 10/766* (2022.01);
(Continued)

(58) Field of Classification Search
CPC .. G06V 10/776; G06V 10/774; G06V 10/764; G06V 10/766; G06V 20/52; G06V 20/13
See application file for complete search history.

(56) References Cited

U.S. PATENT DOCUMENTS

| | | | |
|---|---|---|---|
| 10,755,146 | B2 | 8/2020 | Jacobs et al. |
| 2016/0063516 | A1 | 3/2016 | Terrazas et al. |

(Continued)

FOREIGN PATENT DOCUMENTS

| | | |
|---|---|---|
| JP | 2019-179320 A | 10/2019 |

OTHER PUBLICATIONS

Longbiao Chen et al. "UVLens: Urban Village Boundary Identification and Population Estimation Leveraging Open Government Data", Proc. ACM Interact. Mob. Wearable Ubiquitous Technol., vol. 5, No. 2, Jun. 2021, 57:1-57:26 (26 Pages).

(Continued)

*Primary Examiner* — Christopher S Kelley
(74) *Attorney, Agent, or Firm* — Sughrue Mion, PLLC

(57) ABSTRACT

An information processing apparatus (1) includes: an acquisition unit (12) configured to acquire a satellite image; a first generation unit (13) configured to recursively predict and generate a first image representing a distribution of population values with respect to the satellite image, through machine learning, using the satellite image as an input; and a second generation unit (13) configured to predict and generate a second image representing probabilities of land types with respect to the satellite image, through the machine learning.

11 Claims, 10 Drawing Sheets

(51) Int. Cl.
*G06V 10/766* (2022.01)
*G06V 10/774* (2022.01)
*G06V 20/13* (2022.01)
*G06V 20/52* (2022.01)

(52) U.S. Cl.
CPC ............ *G06V 10/774* (2022.01); *G06V 20/13* (2022.01); *G06V 20/52* (2022.01)

(56) References Cited

U.S. PATENT DOCUMENTS

2020/0272625 A1* 8/2020 Brumby .............. G06F 16/2228
2021/0209136 A1* 7/2021 Jha .......................... G06F 16/29

OTHER PUBLICATIONS

Workman et al., “A Unified Model for Near and Remote Sensing”, 2017 IEEE International Conference on Computer Vision, pp. 2707-2716, 2017 (10 pages total).

Dwivedi et al., “Development of Population Distribution Map and Automated Human Settlement Map Using High Resolution Remote Sensing Images”, IGARSS 2018, pp. 7224-7227, 2018 (4 pages total).

Caleb Robinson, et al., “A Deep Learning Approach for Population Estimation from Satellite Imagery”, Proceedings of the 1st ACM SIGSPATIAL Workshop on Geospatial Humanities, Aug. 2017, pp. 47-54.

* cited by examiner

FIRST PART
SECOND PART
SATE-LLITE IMAGE
POPULA-TION DATA
LAND CLASSIFI-CATION DATA
512x512
6
64
256x256
154x154
16
1
INPUT LAYER
Conv2D
DOWNSAMPLING (MaxPooling2D or Bilinear Interpolation)
UPSAMPLING (UpSampling2D)
SPLIT

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is a National Stage of International Application No. PCT/JP2021/038267 filed Oct. 15, 2021.

TECHNICAL FIELD

The present invention relates to an information processing apparatus, an information processing method, and a program, and particularly to a technique for predicting population through machine learning.

BACKGROUND ART

The world's population is dynamically changing from time to time. Prediction of population and flows of people at a given point in time can be used for all purposes, including public health and commerce. For example, prediction of population and flows of people can be useful in disease impact analysis, disaster mitigation measures, store location planning, urban planning, traffic engineering, and so on.

One of the population data sets available around the world is census data, which is national survey data. Many countries around the world conduct a census every few years to gather information regarding population size, composition, and demographics.

On the other hand, research regarding techniques for predicting population is also underway. Non-Patent Literature Document 1 describes a method for directly predicting population in a given area by inputting satellite images to a learning model that is based on a neural network (CNN (Convolutional Neural Network)). The satellite images are images taken by various earth observation optical satellites and can be acquired from the official websites of the optical satellites. The learning model is a learning model created using satellite images, and census data regarding population.

LISTING OF REFERENCES

Non-Patent Literature Documents

Non-Patent Literature Document 1: Caleb Robinson, Fred Hohman, Bistra Dilkina, "A deep learning approach for population prediction from satellite imagery", Proceedings of the 1st ACM SIGSPATIAL Workshop on Geospatial Humanities, 47-54, 2017

SUMMARY OF THE INVENTION

Problems to be Solved by the Invention

Census data is usually collected and published only once every 5 to 10 years, and the spatial resolution of population data is low because data is only required to be at sufficient level for the government to take measures. In addition, although a survey-based census can provide a comprehensive picture of a country's population situation, it is expensive to implement, and the population of a wide area cannot be grasped.

The method disclosed in Non-Patent Literature Document 1 makes it possible to predict the population from satellite images, and the learning model used is a learning model created using satellite images and census population data. That is to say, the learning model is a learning model created using only population data as correct data, and there is a problem in that the accuracy of population prediction is low.

The present invention has been made in view of the above problems, and an object of the present invention is to provide a technique for accurately predicting a population.

Solution to the Problems

To solve the above-described problem, one aspect of an information processing apparatus according to the present invention includes: an acquisition unit configured to acquire a satellite image; a first generation unit configured to recursively predict and generate a first image representing a distribution of population values with respect to the satellite image, through machine learning, using the satellite image as an input; and a second generation unit configured to predict and generate a second image representing probabilities of land types with respect to the satellite image, through the machine learning.

The satellite image may be an image obtained by normalizing data that is obtained by an earth observation optical satellite and in which a plurality of spectral bands are used, for each of the plurality of spectral bands.

The information processing apparatus may further include a training unit configured to train a learning model for the machine learning, and the training unit may use a plurality of satellite images as input data, and an image representing a land class and an image representing a population that correspond to the plurality of satellite image, as correct data, to train the learning model.

The learning model may include a first part to which the satellite images are input and a second part that outputs the first image and the second image that have been predicted, the first part may include a plurality of convolutional layers, and the second part may include a first branch and a second branch, and the first branch and the second branch each include a plurality of convolutional layers.

The first branch may be formed as a regression model for predicting the first image and the second branch may be formed as a classification model for predicting the second image.

The classification model may be formed so that water, urban, a cropland, a grassland, a forest, and a bare land can be classified with respect to the land class.

The training unit may use two loss functions for evaluating an output from the regression model and an output from the classification model that correspond to the correct data, to train the learning model.

The loss function applied to the output from the regression model may be a mean squared error, and the loss function applied to the output from the classification model may be a softmax cross-entropy error.

The information processing apparatus may further include a third prediction unit configured to predict a flow of population based on the predicted first image and positional information regarding terminal devices in which a predetermined application configured to acquire positional information is running.

The third prediction unit may predict home positions of users of the terminal devices based on position information regarding the terminal devices, calculate a scaling factor for each of the terminal devices through a geographically weighted regression model, using a distribution of the home positions and a distribution of populations indicated by the first image, and predict the flow of population based on movement of the terminal devices and the scaling factor.

One aspect of an information processing method according to the present invention is an information processing method carried out by an information processing apparatus, including: acquiring a satellite image; recursively predicting and generating a first image representing a distribution of population values with respect to the satellite image, through machine learning, using the satellite image as an input; and predicting and generating a second image representing probabilities of land types with respect to the satellite image, through the machine learning.

One aspect of an information processing program according to the present invention is an information processing program for enabling a computer to perform information processing, the program enabling the computer to perform: acquisition processing to acquire a satellite image; first generation processing to recursively predict and generate a first image representing a distribution of population values with respect to the satellite image, through machine learning, using the satellite image as an input; and second generation processing to predict and generate a second image representing probabilities of land types with respect to the satellite image, through the machine learning.

Advantageous Effects of the Invention

With the present invention, it is possible to predict a population with high accuracy.

Objects, aspects, and effects of the present invention described above, and objects, aspects, and effects of the present invention not described above will be understood by those skilled in the art from the following Description of Embodiments of the present invention with reference to the attached drawings and claims.

DESCRIPTION OF EMBODIMENTS

Figure 1:
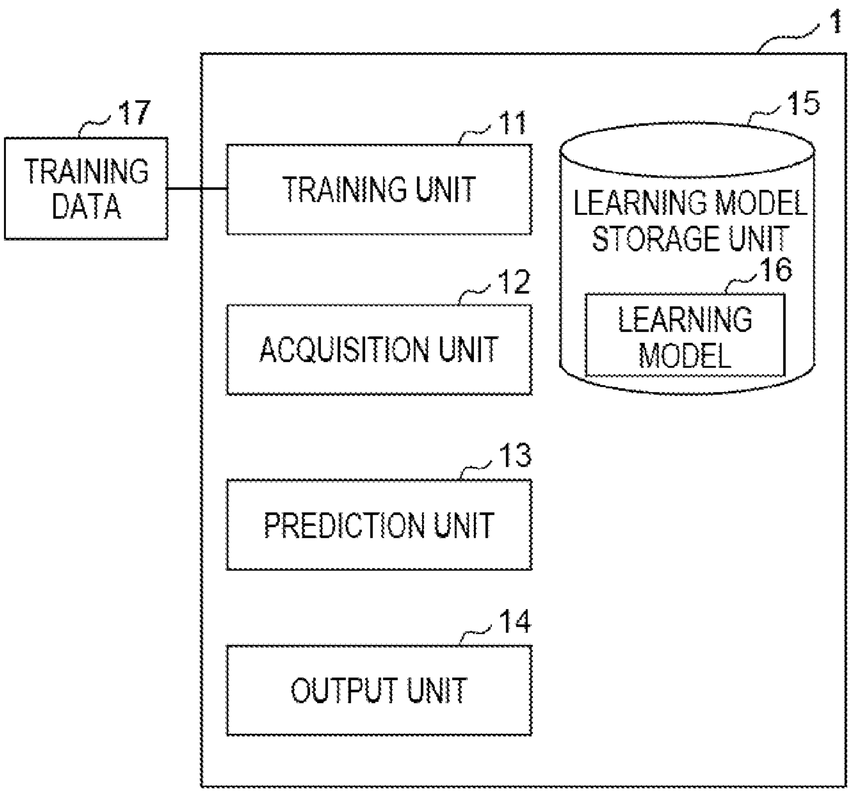
FIG. 1 is a block diagram showing an example of a functional configuration of an information processing apparatus according to an embodiment of the present invention.

Hereinafter, embodiments for carrying out the present invention will be described in detail with reference to the accompanying drawings. Among the constituent elements disclosed below, those having the same function are designated by the same reference numerals, and the descriptions thereof will be omitted. Note that the embodiments disclosed below are examples of means for realizing the present invention, and should be modified or changed as appropriate depending on the configuration of the device to which the present invention is applied and on various conditions. The present invention is not limited to the embodiments below. In addition, not all the combinations of the features described in the embodiments are essential for the solutions according to the present invention.

First Embodiment

Functional Configuration of Information Processing Apparatus

An information processing apparatus according to the present embodiment predicts and generates population data (a first image representing the distribution of population values) and land classification data (a second image representing the probability of a land type (also referred to as land classification)) by acquiring satellite images and applying the satellite images to a learning model. The learning model is a learning model trained using satellite images as inputs and population data and land classification data as correct data.

FIG. 1 shows an example of a functional configuration of an information processing apparatus 1 according to the present embodiment.

The information processing apparatus 1 shown in FIG. 1 includes a training unit 11, an acquisition unit 12, a prediction unit 13, an output unit 14, and a learning model storage unit 15. The learning model storage unit 15 stores a learning model 16.

Figure 3A:
FIG. 3A is a diagram showing examples of training data.
Figure 3B:
FIG. 3B is a diagram showing examples of training data.
Figure 3C:
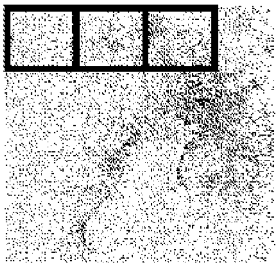
FIG. 3C is a diagram showing examples of training data.

Using training (teacher) data 17, the training unit 11 trains a deep learning model (hereinafter referred to as a learning model) that employs a neural network (CNN (Convolutional Neural Network)) for machine learning. The learning model is for performing multi-task learning through a regression approach and a classification approach, as described below. In the present embodiment, satellite images, population data, and land classification data are used as the training data 17. Specifically, the training unit 15 creates a learning model using satellite images as input data and population data and land classification data as correct data (Ground Truth Data). The training data 17 used to create a learning model will be described with reference to FIGS. 3A, 3B and 3C. FIGS. 3A, 3B and 3C are diagrams showing an example of the training data 17.

FIG. 3A shows an example of a satellite image acquired from Sentinel-2, showing a satellite image of an area around Tokyo, Japan. Satellite images can be acquired from various earth observation optical satellites, for example, from Sentinel-2, which is a European earth observation optical satellite. Satellite images from Sentinel-2 may be added (updated) daily as they become available. The images can be downloaded from a predetermined website for the optical satellite.

In the present embodiment, it is assumed that images collected from the satellite data acquired from Sentinel-2 at a resolution (spatial resolution) of 30 m is used as satellite images. It is also assumed that the satellite images are multispectral data using six spectral bands, namely blue, red, red, NIR (Near Infrared), SWIR (Shortwave Infrared) 1, and SWIR2. Thus, the satellite images are data formed using six spectral bands, and are color images. However, the satellite images are shown as grayscale images in FIG. 3A.

In order to accelerate the convergence of the training process performed by the training unit 11, the satellite images may be normalized as shown in Formula (1) (the mean is 0 and the variance is 1).

[Math. 1]

$$Xnorm_{(i)} = (X - X_{mean\,(i)})/X_{std(i)} \quad (1)$$

Here, X represents a satellite image, i represents each spectral band of the satellite image, mean represents the mean, and std represents the standard deviation.

In order to improve the efficiency of the training process, the training unit 11 cuts out the satellite image into patches (image patches), thereby dividing the satellite image, to generate divided satellite images. In the present embodiment, the training unit 11 divides the satellite image shown in FIG. 3A into divided satellite images that each have 512×512 pixels.

FIG. 3B shows an example of land classification data. Here, LULC (Land Use and Land Cover) data (an image representing a LULC) is shown as an example of land classification data. LULC data can be acquired from predetermined research agencies in each region. LULC data for Japan can be acquired from the website of the Earth Observation Research Center (EORC) of the Japan Aerospace Exploration Agency (JAXA). JAXA is an organization that conducts research and development in the field of aerospace. LULC data that can be acquired from JAXA EORC represents various classes such as water, urban, a cropland, a grassland, a forest, and a bare land so that they can be categorized (distinguished). Although each class is expressed in the color corresponding to the class, FIG. 3B shows a greyscale image.

It is assumed that the land classification data shown in FIG. 3B has a (spatial) resolution of 30 m, as in the satellite image shown in FIG. 3A. For the learning process, the training unit 11 cuts out land classification data into patches, thereby dividing the land classification data, to generate divided land classification data (divided land classification images). In the present embodiment, the training unit 11 divides the land classification data shown in FIG. 3B into pieces of divided land classification data that each have 512×512 pixels.

FIG. 3C shows population data (an image representing a population distribution). In the present embodiment, population data can be acquired from the Worldpop's website, for example. The population data shown in FIG. 3C can be obtained by mapping the acquired numerical data on a map. Such mapping processing may be performed by the training unit 11, by a processing unit (not shown) included in the information processing apparatus 1. Alternatively, the training unit 11 may acquire population data obtained by an external device performing the mapping processing. The population data can be expressed in color according to the population (population density), but is shown as a grayscale image in FIG. 3C.

It is assumed that the population distribution shown in FIG. 3C is expressed at a (spatial) resolution of 100 m. For the training process, the training unit 11 cuts out population data into patches, thereby dividing the population data, to generate divided population data. In the present embodiment, the training unit 11 divides the population data shown in FIG. 3C into pieces of divided population data that each have 154×154 pixels.

The training unit 11 can train the learning model 16 using the divided satellite images, the pieces of divided land classification data, and the pieces of divided population data described above. Specifically, the training unit 11 trains the learning model 16 that receives a divided satellite image as an input and outputs both land classification data and population data (a piece of divided land classification data and a piece of divided population data) corresponding to the divided satellite image, where both the land classification data and the population data provides parameters to be learned, in a complementary manner (train the learning model). An example of the architecture of the learning model will be described later with reference to FIG. 4.

The training unit 11 stores the trained learning model 16 in the learning model storage unit 15.

The acquisition unit 12 acquires satellite images that are to be input to the learning model 16 when population data and land classification data (LULC data in the present embodiment) are to be predicted. The satellite images are similar to the image described with reference to FIG. 3A, and are images that can be acquired from an earth observation optical satellite. The acquisition unit 12 may perform the normalization processing described using Formula (1), on the acquired images, or acquire satellite images that have undergone the normalization processing. The acquisition unit 12 outputs each of the satellite images to the prediction unit 13. The acquisition unit 12 may output each of the satellite images that have undergone normalization processing, to the prediction unit 13.

The prediction unit 13 divides the satellite image output from the acquisition unit 12 in the same manner as the method described with reference to FIG. 3A to generate divided satellite images. Thereafter, the prediction unit 13 applies the divided satellite images to the learning model 16 and performs supervised learning to predict (infer) and generate population data and land classification data corresponding to the divided satellite images. The prediction procedure will be described later with reference to FIG. 4.

In addition, the prediction unit 13 performs processing to predict flows of people, using the generated population data. This processing will be described in the second embodiment.

The output unit 14 outputs the results of the prediction performed by the prediction unit 13 (the generated population data and land classification data). For example, the output unit 14 may output (display) the prediction results to a display unit 26, or to an external device (not shown) via a communication I/F 27.

Hardware Configuration of Information Processing Apparatus

Figure 2:
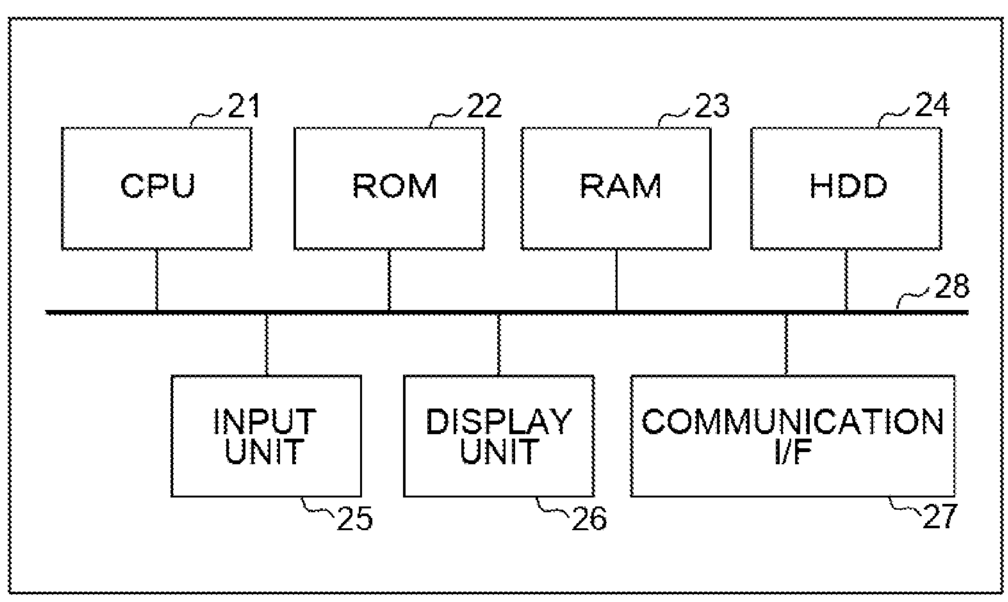
FIG. 2 is a block diagram showing an example of a hardware configuration of the information processing apparatus according to an embodiment of the present invention.

FIG. 2 is a block diagram showing an example of a hardware configuration of the information processing apparatus 1 according to the present embodiment.

The information processing apparatus 1 according to the present embodiment can be implemented on one or more computers of any type, one or more mobile devices of any type, and one or more processing platforms of any type.

Although FIG. 2 shows an example in which the information processing apparatus 1 is mounted on a single computer, the information processing apparatus 1 according to the present embodiment may be mounted on a computer system that includes a plurality of computers. The plurality of computers may be connected to each other via a wired or wireless network so as to be able to communicate with each other.

As shown in FIG. 2, the information processing apparatus 1 may include a CPU 21, a ROM 22, a RAM 23, an HDD 24, an input unit 25, a display unit 26, a communication I/F 27, and a system bus 28. The information processing apparatus 1 may also be provided with an external memory.

The CPU (Central Processing Unit) 21 performs overall control on the operation of the information processing apparatus 1, and controls each of the components (22 to 27) via the system bus 28, which is a data transmission line.

The ROM (Read Only Memory) 22 is a non-volatile memory that stores a control program or the like required for the CPU 21 to perform processing. Note that the program may be stored in a non-volatile memory such as the HDD (Hard Disk Drive) 24 or an SSD (Solid State Drive), or an external memory such as a removable storage medium (not shown).

The RAM (Random Access Memory) 23 is a volatile memory and functions as a main memory, a work area, or the like of the CPU 81. That is to say, the CPU 21 loads a required program or the like from the ROM 22 into the RAM 23 when performing processing, and executes the program or the like to realize various functional operations.

The HDD 24 stores, for example, various kinds of data and various kinds of information required for the CPU 21 to perform processing using a program. Also, the HDD 24 stores, for example, various kinds of data and various kinds of information obtained as a result of the CPU 21 performing processing using a program or the like.

The input unit 25 is constituted by a keyboard or a pointing device such as a mouse.

The display unit 26 is constituted by a monitor such as a liquid crystal display (LCD). The display unit 26 is a GUI (Graphical User Interface) that is a user interface used to input instructions to the information processing apparatus 1, such as various parameters used in keyword specification processing and communication parameters used in communication with other devices.

The communication I/F 27 is an interface that controls communication between the information processing apparatus 1 and external devices.

The communication I/F 27 provides an interface with the network and communicates with external devices via the network. Various kinds of data, various parameters, and so on are transmitted and received to and from external devices via the communication I/F 27. In the present embodiment, the communication I/F 27 may perform communication via a wired LAN (Local Area Network) that conforms to a communication standard such as Ethernet (registered trademark), or a dedicated line. However, the network that can be used in the present embodiment is not limited to these networks, and may be constituted by a wireless network. Examples of this wireless network include wireless PANs (Personal Area Networks) such as Bluetooth (registered trademark), ZigBee (registered trademark), and UWB (Ultra Wide Band). Examples of the wireless network also include wireless LAN (Local Area Networks) such as Wi-Fi (Wireless Fidelity) (registered trademark) and wireless MANs (Metropolitan Area Networks) such as WiMAX (registered trademark). Furthermore, the examples include wireless WANs (Wide Area Networks) such as LTE/3G, 4G, and 5G. The network need only be able to connect devices so as to be able to communicate with each other, and the communication standard, the scale, and the configuration thereof are not limited to the above examples.

At least some of the functions of the constituent elements of the information processing apparatus 1 shown in FIG. 1 can be realized by the CPU 21 executing a program. However, at least some of the functions of the constituent elements of the information processing apparatus 1 shown in FIG. 1 may be configured to operate as dedicated hardware. In this case, the dedicated hardware operates under the control of the CPU 21.

Architecture of Learning Model

Figure 4:
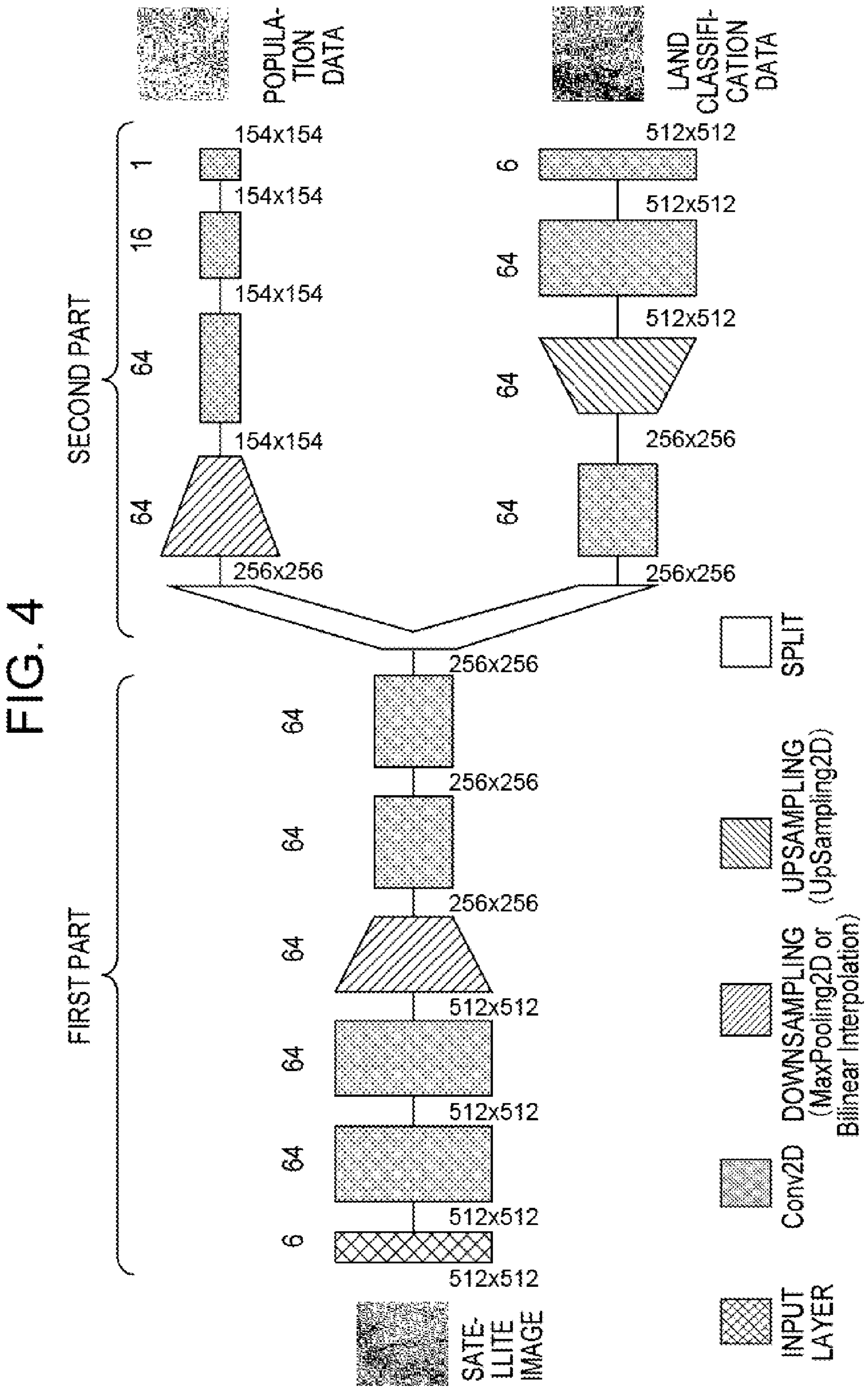
FIG. 4 shows an example of an architecture of a learning model.

FIG. 4 shows an example of an architecture of the learning model 16 created by the training unit 11.

As described above, the learning model 16 is a learning model that receives a divided satellite image as an input and outputs both divided land classification data and population data. Note that, in the description of FIG. 4, a divided satellite image, divided land classification data, and divided population data are respectively referred to as a satellite image, land classification data, and population data. In FIG. 4, the numbers shown between blocks represent pixel sizes.

The learning model 16 is divided into two parts (a first part and a second part). The first part is split at the last block and continues to the second part, and the second part has a population prediction branch that outputs population data (image data showing the distribution of population values) and a land classification prediction branch that outputs land classification data (image data showing the probability of a land type).

The first part includes four CNN blocks (convolutional layers (2Conv2D (two-dimensional convolutional layers))). The first part further includes a downsampling block (pooling layer (MaxPooling2D (two-dimensional pooling layer))).

The input data for the first part is a satellite image of 512×512 pixels. The satellite image is multispectral data formed with six spectral bands as described above. That is to say, the number of input layers is 6. Each computation block has sixty-four filters, and each block with 3×3 kernels employs a ReLU (Rectified Linear Unit) as an activation function.

The second part has two branches (the population prediction branch and the land classification prediction branch), and each branch includes three CNN blocks.

In the second part, the population prediction branch (the upper tier of the second part in FIG. 4) employs a regression approach in machine learning to recursively predict population data based on the input satellite image.

The land classification prediction branch (the lower tier of the second part in FIG. 4) employs a classification approach in machine learning to predict a plurality of classes corresponding to land classification based on the input satellite image. The classes include, for example, six classes, namely, water, urban, a cropland, a grassland, a forest, and a bare land, and elements that cannot be classified into the classes are categorized as unclassifiable.

Thus, the learning model 16 is a learning model that includes both a regression model that employs a regression approach for population data prediction and a classification model that employs a classification approach for land classification, in one network.

The (spatial) resolutions of the population data and the land classification data (see FIG. 3C and FIG. 3B, respectively) are different, and therefore the (spatial) resolutions of the pieces of output data from the two CNNs in the second part are set so as to match the resolution of correct data.

For example, as shown in FIG. 4, in the population prediction branch, the pixel size is resized from 256×256 pixels to 154×154 pixels, using a bilinear interpolation block. Bilinear interpolation is a method of performing linear interpolation in two directions, namely vertical and horizontal directions.

Also, in the land classification prediction branch, the pixel size is subjected to upsampling from 256×256 pixels to 512×512 pixels, which corresponds to the (spatial) resolution of the land classification correct data (i.e., 30 m).

As described above, the learning model 16 according to the present embodiment performs both the regression approach for population data prediction and the classification approach for land classification, in one network. Evaluation values according to two loss functions are used to create and update such a learning model 16 with static population distribution prediction and land classification prediction.

The first loss function is the Mean Squared Error (MSE) and the second loss function is the Softmax Cross Entropy Loss (CE).

MSE is expressed by Formula (2).

[Math. 2]

$$MSE = \frac{1}{n}\sum_{i=1}^{n}(y_i - \hat{y}_i)^2 \tag{2}$$

Here, $y_i$ is the population (population data that serves as correct data) observed in a given divided satellite image i, and $y_i\hat{}$ is the population predicted for the divided satellite image i. n is the number of divided satellite images included in one satellite image (i.e., the number of pieces of population data predicted from one satellite image).

CE is expressed by Formula (3).

[Math. 3]

$$CE = -\sum_{i}^{c} t_i \log(s_i) \tag{3}$$

Here, ti and si are respectively correct data (a correct value) and predicted data corresponding to a class i in land classification (C denotes all classes). The predicted data is a value obtained by applying an activation function (softmax) to the CNN score obtained in the land classification prediction branch.

The training unit 15 updates various parameters of the learning model 16 so that both evaluation values (MSE and CE) of these two loss functions are sufficiently stabilized. By updating the parameters of the learning model 16 based on the two evaluation values in this way, it is possible to predict population data and land classification data (for example, LULC data) with higher accuracy.

Processing Flow

Figure 5:
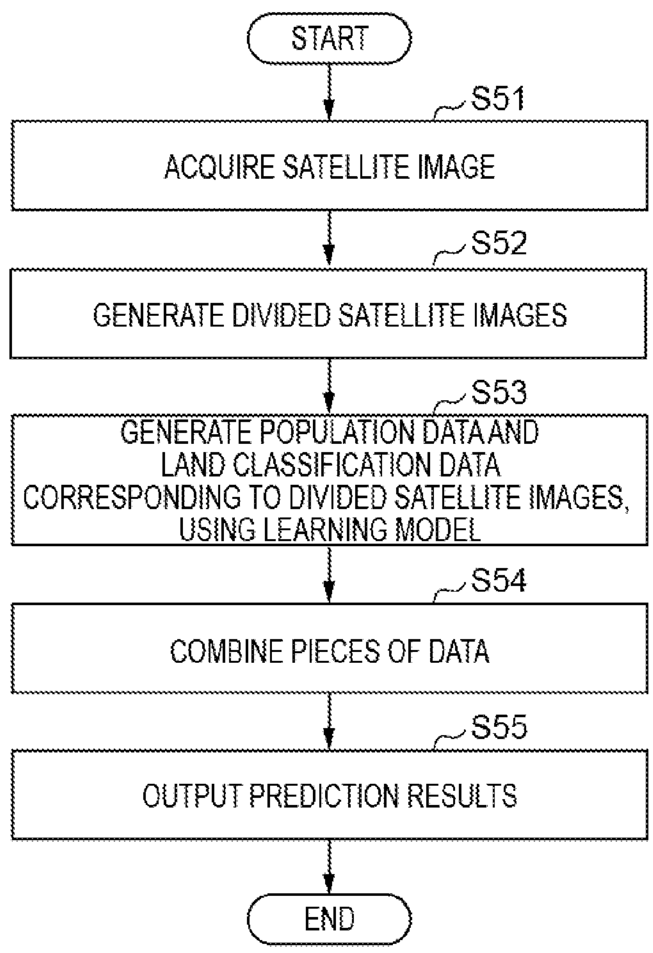
FIG. 5 is a flowchart for processing according to a first embodiment.

FIG. 5 shows a flowchart for the processing that is performed by the information processing apparatus 1.

In S51, the acquisition unit 12 acquires a satellite image. As described above, the satellite image is, for example, data acquired by Sentinel-2. The satellite image may be a satellite image that has undergone normalization processing, as described using Formula (1).

Subsequently, in S52, the prediction unit 13 cuts out the satellite image acquired by the acquisition unit 11 into patches, thereby dividing the satellite image, to generate divided satellite images (image patches). In the present embodiment, the prediction unit 13 divides the satellite image into divided satellite images that each have 512×512 pixels.

S53 is processing for each of the divided satellite images generated in S52. In S53, the prediction unit 13 receives the divided satellite images as inputs, and predicts (infers) and generates population data and land classification data corresponding to the divided satellite images, using the learning model 16 created as described with reference to FIG. 4. The prediction unit 13 performs this prediction processing on every divided satellite image in the satellite image acquired by the acquisition unit 11, and upon completion, processing proceeds to S54. The prediction processing may be performed in parallel on the plurality of divided satellite images.

In S54, the output unit 14 combines the population data and land classification data for all of the divided satellite images obtained through the processing in S53 to generate population data and land classification data for the satellite image obtained in S51, and outputs these pieces of data as prediction results. For example, the output unit 14 may output (display) the prediction results to the display unit 26, or to an external device (not shown) via the communication I/F 27.

Performance Evaluation

Next, the performance of the population prediction and land classification prediction performed based on satellite images using the learning model 16 described with reference to FIG. 4 will be described.

Performance Evaluation on Population Prediction

Table 1 shows performance evaluation results regarding population prediction. Table 1 shows performance evaluation results regarding population prediction for a given satellite image.

TABLE 1

| | |
|---|---|
| Range of Ground Truth Data | 0.0-214.28 |
| Range of Predicted Data | 0.0-163.58 |
| Explained Variance | 0.788 |
| Coefficient of Determination ($R^2$) | 0.788 |
| RMSE | 11.335 |
| MAE | 4.639 |

In Table 1, "Range of Ground Truth Data" is a potential range of correct population data regarding the area of one divided satellite image (512×512 pixels) divided from one satellite image. That is to say, the population indicated by the correct data for one divided satellite image is in the range of 0.0 to 214.28.

"Range of Predicted Data" is the range of predicted population data predicted by the prediction unit 13 according to the learning model shown in FIG. 4 based on one divided satellite image (512×512 pixels) divided from one satellite image. That is to say, the population indicated by the predicted data regarding one divided satellite image is in the range of 0.0 to 163.58.

"Explained Variance" and "Coefficient of Determination" are evaluation indexes in machine learning.

The explained variance is a value that indicates how close the predicted data is to the ground truth data, and the closer the value is to 1, the higher the accuracy is. Regarding the coefficient of determination, the larger the value thereof is, the higher the predictive ability is, and the maximum value thereof is 1.

"RMSE" is a root mean squared error, and is expressed by Formula (4).

[Math. 4]

$$RMSE = \sqrt{\frac{1}{n}\sum_{i=1}^{n}(y_i - \hat{y}_i)^2} \quad (4)$$

In Formula (4), i is the index for the divided satellite images, and n is the number of divided satellite images included in one satellite image. $y_i$ is predicted population data corresponding to the $i^{th}$ divided satellite image, and $y\hat{}_i$ is the population indicated by the correct data for the $i^{th}$ divided satellite image.

"MAE" is a mean absolute error, and is expressed by Formula (5).

[Math. 5]

$$MAE = \frac{1}{n}\sum_{i=1}^{n}|y_i - \hat{y}_i| \quad (5)$$

As in Formula (4), i is the index for the divided satellite images, and n is the number of divided satellite images included in one satellite image. $y_i$ is predicted population data corresponding to the $i^{th}$ divided satellite image, and $y\hat{}_i$ is the population indicated by the correct data for the $i^{th}$ divided satellite image.

Figure 6A:
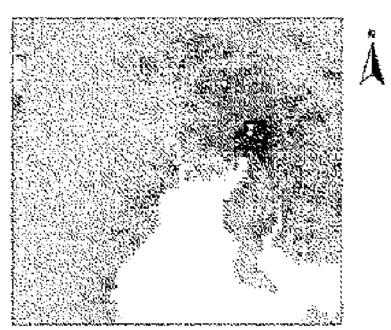
FIG. 6A is a diagram showing correct data of population regarding satellite images.
Figure 6B:
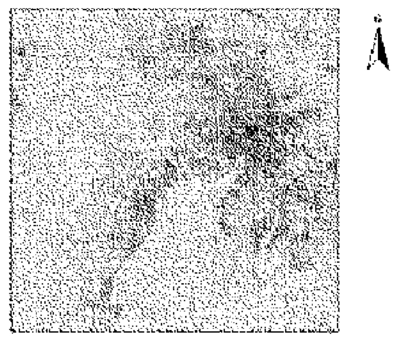
FIG. 6B is a diagram showing predicted data of population regarding satellite images.

FIGS. 6A and 6B show correct data (FIG. 6A) and predicted data (FIG. 6B) of population regarding satellite images. Specifically. FIG. 6A shows correct population data corresponding to the satellite image shown in FIG. 3A (a satellite image of the area around Tokyo in Japan), and FIG. 6B shows predicted population data in the case where the satellite image shown in FIG. 3A is applied to the learning model 16 shown in FIG. 4. That is to say, the predicted population data is obtained by combining the pieces of output data from the population prediction branch (the upper tier of the second part in FIG. 4) in the case where the divided satellite images of the satellite image are input to the learning model 16, for all of the divided satellite images. Although the pieces of population data shown in FIG. 6A and FIG. 6B are actually color images, they are expressed as grayscale images in this example. In both figures, the tendency is that the closer the color is to black, the larger the population is.

A comparison between FIGS. 6A and 6B shows uniform population distributions except for the predicted data in FIG. 6B, which corresponds to the ocean expressed in white in FIG. 6A. That is to say, it can be seen that the distributions of areas with small populations and areas with large populations have similar trends in the two figures.

On the other hand, the results in Table 1 show that the range of the predicted data tends to be smaller than the range of the correct (ground truth) data, and the maximum value in the predicted data tends to be smaller than that in the correct data. These trends are also shown in FIG. 6B, and it can be seen that areas with particularly large populations expressed in black are smaller in the predicted data in FIG. 6B than in the correct data in FIG. 6A. In this way, although areas with particularly large populations are predicted to be smaller than in the correct data, the trend of population distribution in the entire map is similar in these figures, and it can be said that the static population distribution is predicted with high accuracy using the learning model 16 according to the present embodiment.

Performance Evaluation on Land Classification Prediction

Table 2 shows the performance evaluation results regarding land classification prediction for a given satellite image. In the present embodiment, the land classification prediction branch of the learning model 16 shown in FIG. 4 (the lower tier of the second part in FIG. 4) performs classification into, in addition to the six classes (water, urban, a cropland, a grassland, a forest, and a bare land), an "unclassifiable" class, which is a class of elements that cannot be classified into any of the six classes.

TABLE 2

| Class | Precision | Recall | F1-score |
|---|---|---|---|
| Water | 0.96 | 0.87 | 0.92 |
| Urban | 0.76 | 0.91 | 0.83 |
| Cropland | 0.78 | 0.74 | 0.76 |
| Grassland | 0.57 | 0.40 | 0.47 |
| Forest | 0.92 | 0.95 | 0.94 |
| Bare Land | 0.46 | 0.05 | 0.09 |
| Unclassifiable | 0.56 | 0.71 | 0.62 |
| Accuracy | | 0.87 | |

In Table 2, "Precision", "Recall", "F1-score", and "Accuracy" of each class are classification evaluation indexes in machine learning.

The precision indicates the ratio of the number of correct answers predicted through machine learning to the number of true correct answers.

The recall" indicates the ratio of the number of true correct answers to the number of correct answers predicted through machine learning.

The F1-score is a statistical value that is based on a precision and a recall, and is a value calculated through "2×(Precision×Recall)/(Precision+Recall)". The maximum value of the F1-score is 1, and the higher the F1-score is, the higher the classification accuracy is.

Also, the accuracy indicates the proportion of correct predictions of all the predictions.

Table 2 shows that the water and the forest are predicted with higher accuracy. On the other hand, it can be seen that the prediction accuracy for bare land is considerably low.

Figure 7A:
FIG. 7A is a diagram showing correct data of land classification regarding satellite images.
Figure 7B:
FIG. 7B is a diagram showing predicted data of land classification regarding satellite images.

FIGS. 7A and 7B show correct data (FIG. 7A) and predicted data (FIG. 7B) of land classification regarding satellite images. Specifically, FIG. 7A shows correct land classification data corresponding to the satellite image shown in FIG. 3A (a satellite image of the area around Tokyo in Japan), and FIG. 7B shows predicted land classification data in the case where the satellite image shown in FIG. 3A is applied to the learning model 16 shown in FIG. 4. That is to say, the predicted land classification data is obtained by combining the pieces of output data from the land classification prediction branch (the lower tier of the second part in FIG. 4) in the case where the divided satellite images of the satellite image are input to the learning model 16, for all of the divided satellite images. Although the pieces of land classification data shown in FIGS. 7A and 7B are actually color images that distinguish the classes from each other, they are expressed as grayscale images in this example.

A comparison between FIGS. 7A and 7B shows no significant difference, and it can be seen that the land classes are predicted with high accuracy. Considering that bare land has low prediction accuracy as can be seen in Table 2, the absence of bare land in the satellite image in FIG. 3A can be one of the reasons why the land classification prediction data in FIG. 3A is highly accurate.

Figure 8A:
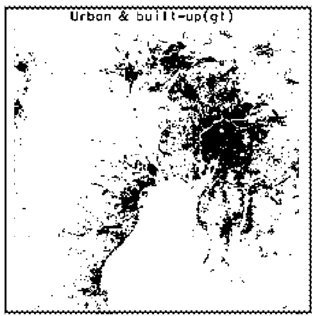
FIG. 8A is a diagram showing correct data and predicted data obtained by extracting a city class from land classification, for satellite images.
Figure 8B:
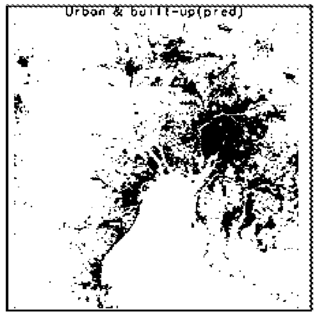
FIG. 8B is a diagram showing predicted data obtained by extracting a city class from land classification, for satellite images.

FIG. 8 shows data obtained by extracting class=city from the correct data and the predicted data regarding land classification shown in FIGS. 7A and 7B. As in FIGS. 7A and 7B, there is no significant difference between the two figures, and it can be seen that the city areas are predicted with high accuracy.

Thus, in the present embodiment, it is possible to predict population and land classification based on satellite images. Therefore, it is possible to predict population and land classification based on the latest satellite images. In addition, by using two kinds of correct data (ground truth) at the time of training, it is possible to predict population and land classification with higher accuracy than with conventional techniques. In this way, population and land classification data close to current real data can be provided, and therefore optimal implementation of disease impact analysis, disaster mitigation measures, store location planning, and urban and transportation planning can be realized.

Second Embodiment

In the first embodiment, satellite images are applied to the learning model 16 to predict population and land classification. The present embodiment describes a method of predicting flows of people, using predicted population data obtained through the method according to the first embodiment.

In the present embodiment, positional information regarding a terminal device in which a predetermined application is installed (downloaded) is used. The number of terminal devices in which the predetermined application is installed is smaller than the population, and the distribution of the terminal devices is ununiform depending on the area. Considering the above, in the present embodiment, a scaling factor is calculated, and flows of people is derived from changing positional information regarding the terminal devices and the scaling factor.

Each terminal device is a device such as a mobile phone, a mobile terminal, a small laptop computer, a tablet terminal, or a smart phone, which is capable of performing wireless communication via a public line or a wireless LAN (Local Area Network).

It is also assumed that the predetermined application is associated with at least a GPS (Global Positioning System), and positional information regarding each terminal device is associated with the ID (identifier) of the terminal device. The predetermined application may be provided by a communication carrier, for example. The information processing apparatus 1 is configured to be able to acquire positional information regarding each terminal device.

In the following description, it is assumed that the terminal device is carried (held) by a user (for example, a person), and a terminal device in which the predetermined application is installed and started up may be referred to as an "AU (Active User) terminal", and the number of such terminal devices may be referred to as an "AU population".

Figure 9:
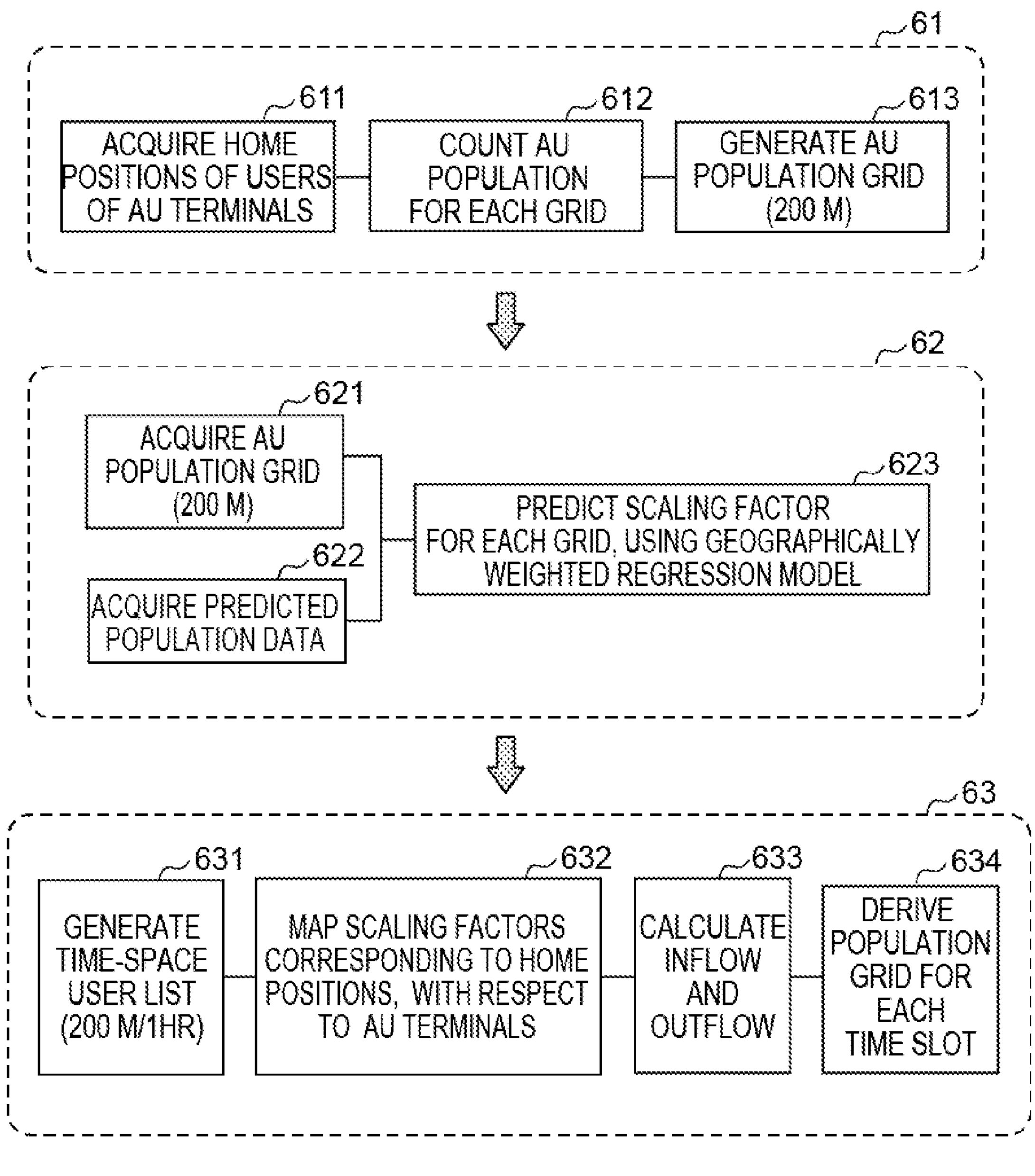
FIG. 9 illustrates a flow of processing according to a second embodiment.

FIG. 9 illustrates the flow of processing according to the present embodiment. The processing is performed by the prediction unit 13 of the information processing apparatus 1.

The processing according to the present embodiment is roughly divided into three blocks.

A block 61 is a block for generating an AU population grid indicating the AU population in each of a plurality of divisions (hereinafter referred to as grids) divided by drawing equidistant grids (grid lines) on a map of a given area. In the present embodiment, one grid is of 200 m×200 m, but may be of another size such as 400 m×400 m. The number of grides in the area is n.

A block 62 is a block for generating a scaling factor for each grid.

A block 63 is a block for calculating population grid per unit time (for example, per 3 hours or per 2 hours).

Hereinafter, the processing performed in each block will be described.

In the block 61, first, in a block 611, the prediction unit 13 acquires a home position (the position of the home) of the user of each AU terminal in association with the ID (identifier) of the AU terminal. For example, the prediction unit 13 acquires the home position of each AU terminal by calculating the geographical centroid (center) thereof based on trajectory data obtained from positional information regarding the AU terminal from 00:00 to 06:00 in the past one month. This is based on the assumption that the users of most AU terminals are at home between from 00:00 to 06:00.

In a block 612, the prediction unit 13 counts the AU population in each grid by mapping (spatially coupling) the home positions of the users of the AU terminals, acquired in the block 611, to the grids.

In a block 613, the prediction unit 13 generates an overall AU population grid from the AU population in each grid counted in the block 612.

The block 62 starts from blocks 621 and 622. In the block 621, the prediction unit 13 acquires the AU population grid generated in the block S613. Also, in the block 622, the prediction unit 13 acquires predicted population data obtained through the method according to the first embodiment. The prediction unit 13 creates population distribution data by sampling the predicted population data (image) into a plurality of level values according to intensity. Thereafter, the prediction unit 13 maps the population distribution data onto a grid having the same size as the AU population grid. As a result, an overall predicted population grid that reflects the predicted population data regarding each grid is generated.

In a block 623, the prediction unit 12 predicts a scaling factor for each grid, using a well-known geographically weighted regression (GWR) model. Using GWR makes it possible to address the local heterogeneity of the data (i.e., the AU population in each grid).

The geographically weighted regression model according to the present embodiment is shown in Formula (6).

[Math. 6]

$$Y=\beta_0+\beta_1X_1+\beta_2X_2+\ldots+\beta_nX_n+E \quad (6)$$

Here, Y is a predicted population (corresponding to the scaled-up AU population). Scaling factors $\beta_0, \ldots, \beta_n$ can be obtained from linear multiple regression using the predicted population. $\beta_0$ is an intercept, and $\beta_1, \ldots, \beta_n$ are scaling factors for AU populations $X_1, \ldots, X_n$ in the 1st, . . . , $n^{th}$ grids, respectively. E is an error term.

Figure 10:
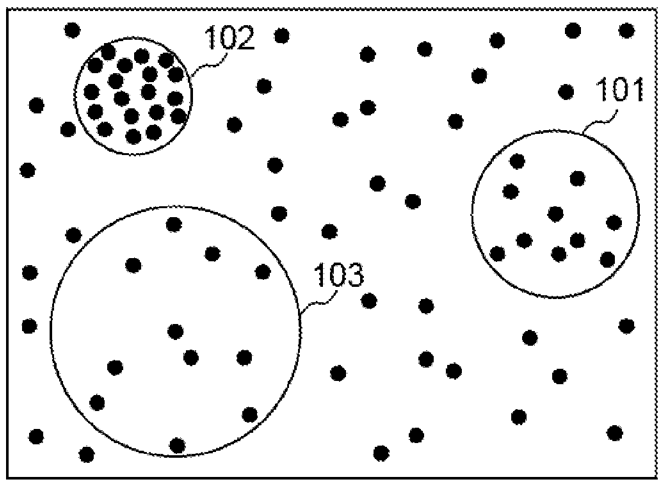
FIG. 10 is a diagram illustrating a concept of calculation of scaling factors β.

FIG. 10 is a diagram illustrating a concept of calculation of the scaling factors β. In FIG. 10, black circles indicate the positions of the AU terminals. As can be seen from FIG. 10, given that the number of AU terminals in an area 101 is a standard number, the density of AU terminals in an area 102 is high and the density of AU terminals in an area 103 is low. In this way, the distribution of the number of AU terminals differs depending on the area. This is because even if most of the population has terminal devices, the number of AU terminals is limited to the number of terminal devices in which the predetermined application is installed and running, and the positions of the users of the devices are not uniformly distributed depending on the user's age, area of residence/activity, and the like.

In the example shown in FIG. 10, the scaling factor β for the area 102 is a small value, and increases for the area 101 and the area 103 in that order.

In the block 63, first, in a block 631, the prediction unit 13 creates a time-space user list. In the present embodiment, the time-space user list is a list of AU terminals for each grid (200 m×200 m) for each hour.

In a block 632, with respect to the AU terminals included in the list generated in the block 631, the prediction unit 13 maps the scaling factors (the block 623) associated with the IDs of the AU terminals and corresponding to the home positions of the AU terminals (the block 611).

In the block 633, the prediction unit 13 calculates an inflow and an outflow for each grid. The inflow and the outflow are respectively expressed by Formulas (7) and (8).

[Math. 7]

$$\text{inflow} = \sum (X_u \in t_i) \,\&\, (X_u \notin t_{i-1}) * s \tag{7}$$

[Math. 8]

$$\text{outflow} = \sum (X_u \notin t_i) \,\&\, (X_u \in t_{i-1}) * s \tag{8}$$

Here, X denotes the current grid at time ti, u denotes the ID of the AU terminal, and s is the scaling factor mapped (assigned) to each user ID.

The inflow is the sum of the scaling factors of the AU users that are present in the $X^{th}$ grid at time ti and are not present at time ti−1.

On the other hand, the outflow is the sum of the scaling factors of the AU terminals that are not present in the $X^{th}$ grid at time ti and are present at time ti−1.

Through the processing so far, the flows of people over all grids for each hour is obtained, and ultimately, in a block 634, the prediction unit 13 derives population grids for continuous time slots.

As described above, according to the present embodiment, it is possible to predict the flows of people from the population data predicted based on satellite images through the method according to the first embodiment and positional information regarding the terminal devices. As a result, for example, congestion in a specific area can be verified, and the congestion can be addressed quickly.

Although the IDs of the devices associated with the pieces of positional information regarding the terminal devices are used in the present embodiment, the gender and age of the user of each device may be used while protecting the anonymity of the user. As a result, it is possible to predict the flows of people according to gender and age, which contributes to various marketing applications.

Although specific embodiments are described above, the embodiments are merely examples and are not intended to limit the scope of the present invention. The devices and the methods described herein may be embodied in forms other than those described above. Also, appropriate omissions, substitutions, and modifications may be made to the above-described embodiments without departing from the scope of the present invention. Embodiments to which such omissions, substitutions, and modifications are made are included in the range of the invention recited in the scope of claims and equivalents thereof, and belong to the technical scope of the present invention.

REFERENCE NUMERALS AND SYMBOLS

1: Information processing apparatus
11: Training Unit
12: Acquisition Unit
13: Prediction unit
14: Output Unit
15: Learning Model Storage Unit
16: Learning Model
17: Training Data

The invention claimed is:

1. An information processing apparatus comprising:
at least one memory configured to store program code;
at least one processor configured to access the program code and operate as instructed by the program code, the program code including:
acquisition code configured to cause at least one of the at least one processor to acquire a satellite image;
first generation code configured to cause at least one of the at least one processor to recursively predict and generate a first image representing a distribution of population values with respect to the satellite image, through machine learning with one learning model, using the satellite image as an input; and
second generation code configured to cause at least one of the at least one processor to predict and generate a second image representing probabilities of land types with respect to the satellite image, through the machine learning,
wherein the learning model includes a first part to which the satellite images are input and a second part that outputs the first image and the second image that have been predicted,
the first part includes a plurality of convolutional layers, and
the second part includes a first branch and a second branch, and the first branch and the second branch each include a plurality of convolutional layers.

2. The information processing apparatus according to claim 1,
wherein the satellite image is an image obtained by normalizing data that is obtained by an earth observation optical satellite and in which a plurality of spectral bands are used, for each of the plurality of spectral bands.

3. The information processing apparatus according to claim 1, further comprising
training code configured to cause at least one of the at least one processor to train a learning model for the machine learning,
wherein the training code is configured to cause at least one of the at least one processor to use a plurality of satellite images as input data, and an image representing a land class and an image representing a population that correspond to the plurality of satellite images, as correct data, to train the learning model.

4. The information processing apparatus according to claim 1, the first branch is formed as a regression model for predicting the first image and the second branch is formed as a classification model for predicting the second image.

5. The information processing apparatus according to claim 4, wherein the classification model is formed so that water, urban, a cropland, a grassland, a forest, and a bare land can be classified with respect to the land class.

6. The information processing apparatus according to claim 4, wherein the training code is configured to cause at least one of the at least one processor to use two loss functions for evaluating an output from the regression model and an output from the classification model that correspond to the correct data, to train the learning model.

7. The information processing apparatus according to claim 6, wherein the loss function applied to the output from the regression model is a mean squared error, and the loss function applied to the output from the classification model is a softmax cross-entropy error.

8. The information processing apparatus according to claim 1, further comprising:

third prediction code configured to cause at least one of the at least one processor to predict a flow of population based on the predicted first image and positional information regarding terminal devices in which a predetermined application configured to acquire positional information is running.

9. The information processing apparatus according to claim 8, wherein the third prediction code configured to cause at least one of the at least one processor to predict home positions of users of the terminal devices based on position information regarding the terminal devices, calculate a scaling factor for each of the terminal devices through a geographically weighted regression model, using a distribution of the home positions and a distribution of populations indicated by the first image, and predict the flow of population based on movement of the terminal devices and the scaling factor.

10. An information processing method carried out by an information processing apparatus, comprising:

acquiring a satellite image;

recursively predicting and generating a first image representing a distribution of population values with respect to the satellite image, through machine learning with one learning model, using the satellite image as an input; and predicting and generating a second image representing probabilities of land types with respect to the satellite image, through the machine learning, wherein the learning model includes a first part to which the satellite images are input and a second part that outputs the first image and the second image that have been predicted, the first part includes a plurality of convolutional layers, and the second part includes a first branch and a second branch, and the first branch and the second branch each include a plurality of convolutional layers.

11. A non-transitory computer readable medium storing a computer program for causing a computer to:

acquire a satellite image;

recursively predict and generate a first image representing a distribution of population values with respect to the satellite image, through machine learning with one learning model, using the satellite image as an input; and predict and generate a second image representing probabilities of land types with respect to the satellite image, through the machine learning, wherein the learning model includes a first part to which the satellite images are input and a second part that outputs the first image and the second image that have been predicted, the first part includes a plurality of convolutional layers, and the second part includes a first branch and a second branch, and the first branch and the second branch each include a plurality of convolutional layers.

* * * * *